United States Patent [19]

Tateshita et al.

[11] 4,179,242

[45] Dec. 18, 1979

[54] METHOD AND APPARATUS FOR LIQUID SUPPLY

[75] Inventors: Tadao Tateshita, Kashiwa; Yasuhiro Mita, Kamagaya; Junichi Nakayama, Chiba; Koichi Sato, Funabashi, all of Japan

[73] Assignee: Hitachi, Ltd., Japan

[21] Appl. No.: 900,320

[22] Filed: Apr. 26, 1978

[51] Int. Cl.² ............................................. F04B 41/06
[52] U.S. Cl. .......................................... 417/8; 417/12; 417/36; 417/53
[58] Field of Search ................................. 417/2–8, 417/12, 17, 36, 38, 40, 43, 44, 53

[56] References Cited

U.S. PATENT DOCUMENTS

| 1,819,774 | 8/1931 | Durdin, Jr. | 417/8 |
| 2,628,995 | 2/1953 | Shanklin | 417/12 X |
| 3,148,622 | 9/1964 | LeVan et al. | 417/12 |

FOREIGN PATENT DOCUMENTS

| 48-29403 | 9/1973 | Japan |
| 50-31521 | 9/1975 | Japan |
| 51-100306 | 9/1976 | Japan |
| 52-6881 | 2/1977 | Japan |

*Primary Examiner*—Carlton R. Croyle
*Assistant Examiner*—Edward Look
*Attorney, Agent, or Firm*—Craig and Antonelli

[57] ABSTRACT

A method and an apparatus for liquid supply use a pressure tank and a plurality of pumps. When the pressure or liquid quantity in the pressure tank has decreased below a predetermined level, a preceding or regular pump starts. When the demand is too large for this pump, another pump in standby position starts, too. The regular pump continues running for a predetermined period of time after the start, even if the pressure or liquid quantity in the pressure tank has returned to a predetermined level, whereas the standby comes to a stop upon such recovery. In this manner the frequency of starting the pumps is minimized so as to avoid overheating of pump-driving motors and reduce the power consumption.

9 Claims, 5 Drawing Figures

METHOD AND APPARATUS FOR LIQUID SUPPLY

LIST OF PRIOR ART REFERENCES (37 CFR 1.56 (a))

The following references are cited to show the state of the art:
Japanese Patent Publication No. 29403/73
Japanese Utility Model Publication No. 31521/75
Japanese Utility Model Publication No. 6881/77
Japanese Patent Laid-Open No. 100306/76.

BACKGROUND OF THE INVENTION

This invention relates to a method for liquid supply and an apparatus therefor comprising a pressure tank and a plurality of pumps.

Frequent starting of a pump, in extreme cases, can cause overheating or seizure of the driving motor. To avoid the possibility, it has been proposed in Japanese Patent Publication No. 29403/73 to provide a plurality of pumps and operate them by turns to decrease the starting frequency of each pump. According to the prior invention, two pumps, for example, are operated for alternate periods. Each pump therefore must have sufficient capacity to meet the demand of maximum quantity of liquid supply. If an additional pump is made available when the demand is too large for a single pump, as taught by Japanese Utility Model Publication No. 31521/75, the two pumps will be able to cooperate to satisfy the demand, with less capacity each. Further, if the pump that operates first is shifted to the standby pump and vice versa whenever the preceding pump stops, then the numbers of runs of the two pumps will be equalized. Such a proposal has been made in Japanese Utility Model Publication No. 6881/77 for applications such as a pumping station using a couple of submerged pumps for draining spring water from a construction site. The apparatus disclosed operates the both pumps simultaneously or either pump alone depending on the level of spring water.

Also known in the art is a technique described in Japanese Patent Laid-Open No. 100306/76 and which employs a liquid supply apparatus having a pressure tank which permits a running pump to continue operation for some time after the pressure or liquid quantity in the tank has been again built up following the delivery, so that the frequency of pump starting may be decreased.

Those prior art teachings might be combined to provide an apparatus which includes a plurality of pumps, say, a preceding or regular pump and a standby pump, so that when the demand surpassed the capacity of the regular pump the standby pump would work, too, and, once started, the both pumps would go on running for a predetermined period of time, even after the recovery of pressure or liquid quantity to the original level within the pressure tank. It would be further possible to arrange so that the pump that operated first serves as the standby and vice versa in the next run and so forth in the ensuing runs.

However, such a combination would nevertheless be undesirable because of wasteful consumption of power. Even if the demand for liquid dwindled to a degree such that the assistance by the standby pump was no longer necessary, the pump once started would have to continue running for the predetermined period. This means that the preceding and standby pumps would both be required to continue working at the sacrifice of efficiency and economy.

SUMMARY OF THE INVENTION

According to this invention, a plurality of pumps are assigned for preceding or regular service and for standby use, so that when the regular pump fails to meet the demand the standby cooperates. Once started, the regular pump will continue running for a predetermined period of time after the pressure or liquid level in a pressure tank has again risen to a level high enough for discontinuation of the regular pump operation. The standby pump, on the other hand, is designed to start immediately upon an increase of demand for the liquid such that the additional pump capacity is needed, and to stop as soon as its assistance becomes unnecessary due to reduced demand. In this way the regular pump is infallibly operated for at least a predetermined period of time after the start. Proper choice of the predetermined period will render it possible to avoid overheating of the pump-driving motor. The standby pump may repeat short runs up to several times during the period between the start and stop of the regular pump. Also, it is likely to remain inoperative throughout the operating time of the regular pump. Even when the standby pump does work, it takes some time to start after the regular pump has started. In the long run, therefore, the frequency of starting of the standby pump cannot be so high. The starting frequencies of the regular and standby pumps can both be limited so as to prevent overheating of the driving motors. Since the standby pump operates only when the demand for the liquid is large enough to need additional pumping capacity, power is not wastefully consumed and efficient operation of the both pumps is assured.

When the regular pump has stopped and the standby pump is inoperative, the pump that has served as the regular one may be assigned for the standby use in the next run, and vice versa. This switching of uses will bring the operation frequencies of the two pumps closer to equality.

The regular and standby pumps may be started and stopped by means of pressure relays responsive to variation in the pressure in the pressure tank. To be more exact, the arrangements may be such that the regular pump is started when the pressure in the tank has decreased to a first pressure, and the standby pump, too, is started when the pressure has further dropped to a lower level or second pressure. The regular pump is stopped when the pressure in the tank has recovered to a third pressure which is higher than the first, and the standby pump is stopped when the pressure has again increased to a fourth pressure higher than the first. The third and fourth pressures may be equal or either pressure may be higher than the other. When the liquid level instead of the pressure in the pressure tank is relied upon for the start-stop control of the pumps, the arrangements are such that the regular pump starts at the point the liquid level has lowered to a first level, and the standby pump starts upon further descent of the level to a second level below the first. The preceding pump is stopped as soon as the liquid level has come up again to a third level above the first, and the standby pump is stopped upon recovery to a fourth level above the first. The third and fourth levels may be the same or either level may be higher than the other.

While the regular pump is started and stopped by sensing variations in the pressure or liquid level in the pressure tank, the start-stop control of the standby pump may be alternatively accomplished by sensing variations in the demand for the liquid. To attain this latter end, it is only necessary to measure the rate of liquid flow through the main on the delivery side of the pressure tank, and allow the standby pump to start when the demand for the liquid has exceeded a predetermined value and stop when the demand has fallen below a predetermined value.

The piping may be designed so that the liquid from either all pumps or one or more pumps passes the pressure tank. Also, either one pressure tank or a plurality of such tanks may be installed.

From the foregoing description it will be readily understood that the term "standby pump" as used herein means a pump which may be operated, when necessary, following the starting of the preceding or regular pump. It will also be clear to those skilled in the art that the sensing of the pressure or liquid level in the pressure tank or the measurement of the flow rate in the main is tantamount to the determination, direct or indirect, of the quantity of liquid in demand at the consumping point.

DESCRIPTION OF THE PREFERRED EMBODIMENTS

Figure 1:
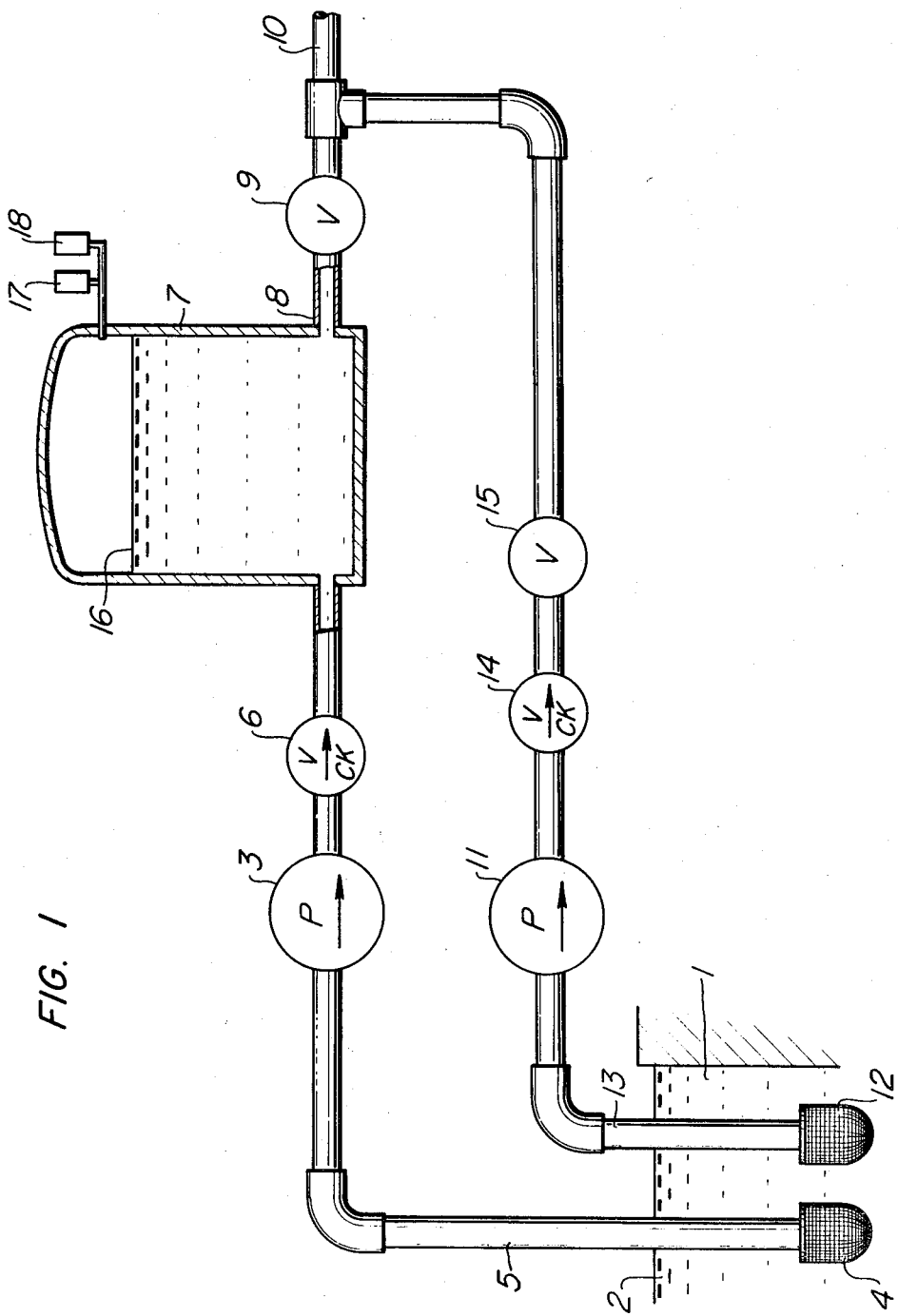
FIG. 1 is a piping diagram of a liquid supply apparatus embodying the invention.

FIG. 1 shows an apparatus of the invention in which two pumps of equal capacity are combined for water supply. The reference numeral 1 designates a water tank containing water up to the level indicated at 2. Of the two pumps, the first, 3, is designed to suck up water from the tank 1 through a foot valve 4 and a suction line 5. The delivery side of the first pump 3 is connected to a pressure tank 7 through a check valve 6. The outlet 8 of the pressure tank 7 is connected via a sluice valve 9 to a main 10 leading to the point or points of consumption (not shown). The other pump, the second, 11, likewise draws up water from the tank 1 through a foot valve 12 and a suction line 13. The delivery side of the second pump 11 is connected to the main 10 via a check valve 14 and a sluice valve 15. The water level 16 in the pressure tank 7 varies with the pump delivery and the quantity of flow through the main 10. The space above the water level 16 within the tank is filled with compressed air. Because the pressure tank 7 is hermetically sealed, the pressure inside is tantamount to the discharge pressure of the pump. The pressure and rate of discharge are related to the characteristics of the pump, and the pressure in the tank 7 varies according to the discharge rate of the pump, or the quantity of flow through the main 10. FIG. 3 graphically indicates the relationship between the pressure in the tank, or the combined head H of the pumps 3, 11 and the quantity of flow Q through the main 10, or the sum of discharge rates of the same pumps. The curve A represents the relation where either pump 3 or 11 alone is running, and the curve B represents the relation where the both pumps are in operation. Pressure relays 17, 18 are provided to work in response to the pressure in the tank 7. The contacts of the pressure relay 17, shown in FIG. 2, close when the pressure H in the tank 7 drops to the first pressure $H_1$ as indicated in FIG. 3, remain closed until the recovery of the pressure to the third level $H_3$, and then open at that and higher pressure. Similarly, the contacts 18c of the pressure relay 18, shown in FIG. 2, close when the pressure H in the tank 7 drops to the second pressure $H_2$ as in FIG. 3, remain closed until the pressure returns to the fourth level $H_4$, opening at that and higher pressures. When it occurs that the air trapped in the pressure tank 7 gradually dissolves in water and leaves the tank through the water outlet, replenishment of air becomes necessary. An air compressor not shown may be separately installed for the replenishment purpose. Alternatively, the pumps themselves may be designed to supply the necessary air, as taught by Japanese Utility Model Publication No. 28244/74. The frequency of air replenishment can be reduced by stretching a membrane of elastic material not shown over the water surface, thus providing insulation between the air and water. Also, in FIG. 2, there are shown electric motors 19, 20 for driving the first and second pumps 3, 11, respectively. The motor 19 is connected to a power source R.S.T. through contacts 21a to be closed upon actuation of a relay 21 and also through a circuit breaker 22. The motor 20 is likewise connected to the source R.S.T. through contacts 23a to be closed upon actuation of a relay 23 and through the circuit breaker 22. A ratchet relay 24 includes change-over switches $S_1$, $S_2$, which when actuated move their movable contacts c from stationary contacts a to contacts b or reversely. A timer 25 is incorporated in the circuitry to start timing immediately upon connection to the power supply so as to open contacts 25b after the lapse of a predetermined period. The contacts 25b close as soon as the timer is cut off from the power source. The timer 25 and the contacts 25b and 21a' are arranged in series and connected at both ends to control source lines 26, 27. The contacts 21a' close when the relay 21 is energized. The relay 21, the contacts c, a of the change-over switch $S_1$, and the contacts 17c are arranged in series and connected at both ends to the lines 26, 27. A line 28 serves as a bridge which makes the contacts 17c in parallel with the contacts 21a' and 25b which are in series. In the like manner, the relay 23, the contacts c, a of the change-over switch $S_2$, and the contacts 18c are arranged in series and connected at both ends to the lines 26, 27. The contact a of the switch $S_1$ is connected to the contact b of the switch $S_2$, and the contact b of the switch $S_1$ to the contact a of the switch $S_2$. The ratchet relay 24 and the contacts 21b, 23b are arranged in series and connected at both ends to the lines 26, 27. The contacts 21b, 23b are closed when the relays 21, 23 are released.

Thus, the timer 25 and the contacts 25b, 21a', 17c combine to form stop control means for the regular pump, and the contacts 18c constitute stop control means for the standby pump. The ratchet relay 24, the contacts 21b, 23b, and the change-over switches $S_1$, $S_2$ jointly serve as means for switching the pumping operation from the regular pump to the standby and vice versa.

The setting of the timer 25 depends on varied factors including the permissible frequencies of starting of the motors 19, 20, the capacity of the pressure tank 7, the preset working pressures of the pressure relays 17, 18, and the capacities of the pumps 3, 11. Generally, a long-interval time setting will extend the period of running operation of pump with the delivery closed, and a short-interval setting will increase the frequency of pump starting. These opposite factors must be weighed and balanced in finding the optimum value.

With the construction above described, the system is assumed, by way of illustration, in conditions such that the pumps 3, 11 are not in operation, the contacts c, a of the switches $S_1$, $S_2$ are closed, and the contacts 17c, 18c are open. As demand arises at the consuming end, water is supplied from the pressure tank 7 through the main 10 to the consumer. Accordingly, the pressure in the tank decreases gradually. When the pressure has dropped to the first pressure level $H_1$, the pressure relay 17 works, closing the contacts 17c. This actuates the relay 21 and closes the contacts 21a, with the result that the motor 19 is started and the pump 3 is driven as the preceding or regular pump. The contacts 21a', too, are closed and the timer 25 begins working.

Now if the quantity of water consumed, $q_2$, is less than the quantity delivered by the pump 3, $q_1$, the balance, or $q_1-q_2$, will be left in the pressure tank 7. The pressure in the tank will thus be gradually recovered. When the pressure exceeds the third pressure level, the pressure relay 17 will be actuated to open the contacts 17c. If at this time the predetermined time to which the timer 25 had been set is over, the contacts 25b will be already open, and therefore the relay 21 will be immediately deenergized, bringing the pump 3 to a stop. Conversely if the preset time is yet to elapse, the contacts 25b will remain closed and the relay 21 will continue to be energized. Hence the pump 3 will go on running. When the predetermined time set on the timer 25 has been elapsed, the contacts 25b open to release the relay 21 and stop the pump 3. The ratchet relay 24 is once deenergized at the point of time when the relay 21 has been energized. When the latter has been set free, the contacts 21b close, with the consequence that the ratchet relay 24 is energized to change over the switches $S_1$, $S_2$, connecting their contacts c and b. The contacts 25b reclose as soon as the timer 25 is cut off from the power supply.

It is assumed that the pressure in the tank 7, in the state just described, has again dropped to the first pressure $H_1$. The contacts 17c then close, this time energizing the relay 23. This enables the pump 11 to start as the regular pump. If more water is consumed than is delivered by the pump 11, the pressure in the pressure tank 7 will further decrease. At the point it has decreased to the second pressure $H_2$, the pressure relay 18 is actuated to close the contacts 18c. Thus, the relay 21 is energized, and the pump 3 in the standby position begins to operate. The pressure in the tank consequently increases. When it has reached the third pressure $H_3$ or upwards, the contacts 17c open. If the preset time on the timer 25 had been elapsed, the contacts 25b remain open and the pump 11 will immediately stop. If it is within the preset time, the contacts 25b remain closed and the pump 11 will continue running. When the preset time on the timer 25 is over, the contacts 25b open and the pump 11 stops. Also, when the pressure in the tank 7 has risen up to the fourth pressure $H_4$, the contacts 18c of the pressure relay 18 open, thus bringing the pump 3 to a stop. The ratchet relay 24 is deenergized as the contacts 23b open when the relay 23 has been energized. Then, the contacts 21b open, too. The contacts 21b, 23b close, respectively, when the relays 21, 23 have been deenergized. Therefore, the ratchet relay 24 is energized when the both pumps 3, 11 have been deenergized, to switch the change-over switches $S_1$, $S_2$ to the positions shown. From then on, the regular and standby pumps are shifted when the regular pump has come to a stop and when the standby is out of operation. While a few examples of pumping operations in accordance with the invention have been described, it is considered possible with this circuitry to repeat the starting and stopping of the standby pump independently of the regular pump in operation. The explanation of the latter case is omitted because it will be understood by those skilled in the art from the foregoing description.

Figure 3:
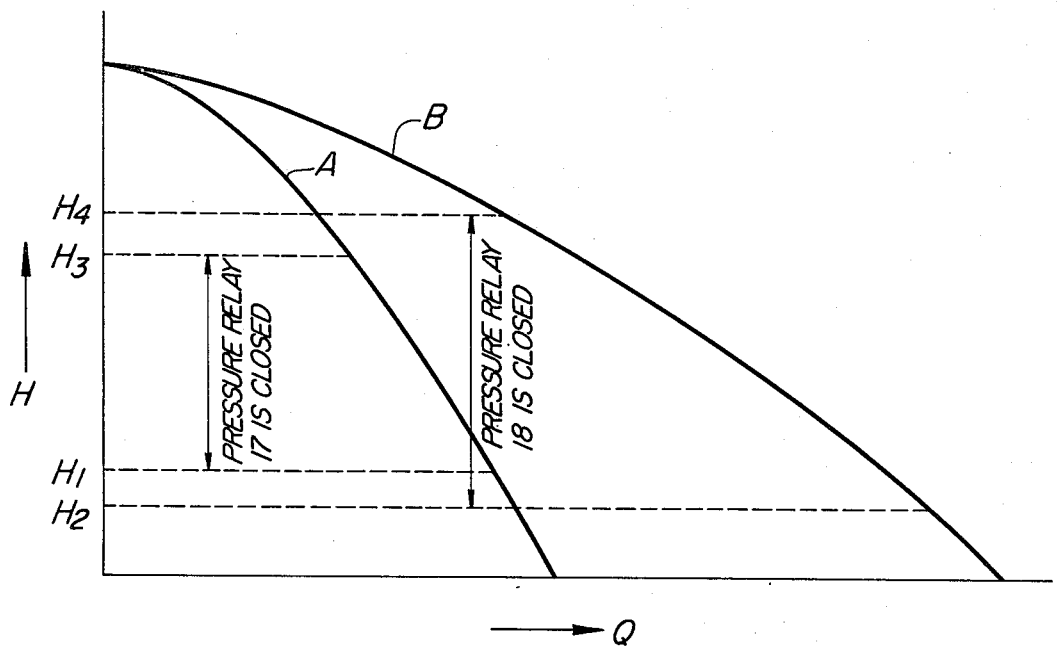
FIG. 3 is a graph of characteristics showing the relation between the flow rate and pressure to be used in explaining the pressure levels in the pressure tank and the starting and stopping points of the pumps.
Figure 4:
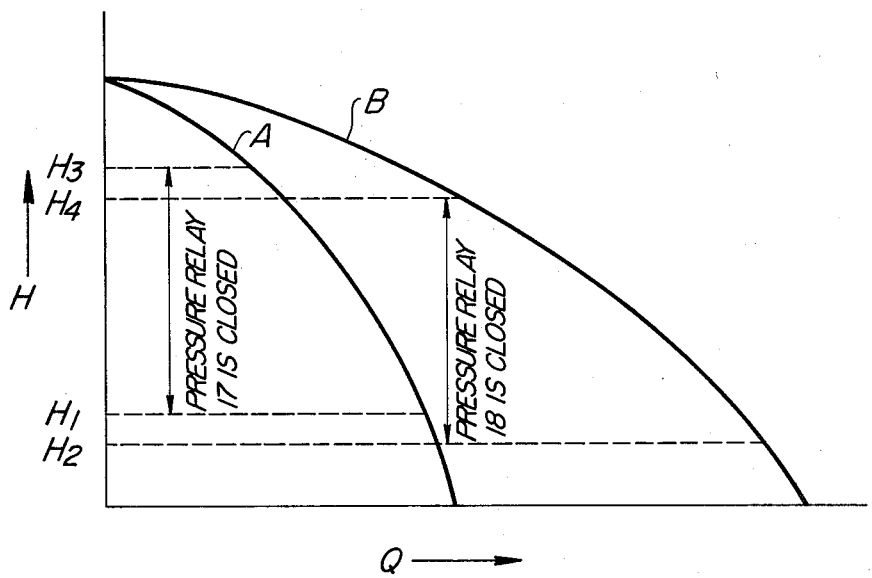
FIG. 4 is a graph similar to FIG. 3, except for pressure settings.

Although the embodiment graphically represented in FIG. 3 has been described with the pressure setting of the fourth sensor means ($H_4$) made higher than that of the third sensor means ($H_3$), the settings may be reversed as in FIG. 4. With the pressure settings of FIG. 4, the standby pump, when running together with the regular pump, can be brought to a stop before the regular one, regardless of the timer operation.

Figure 2:
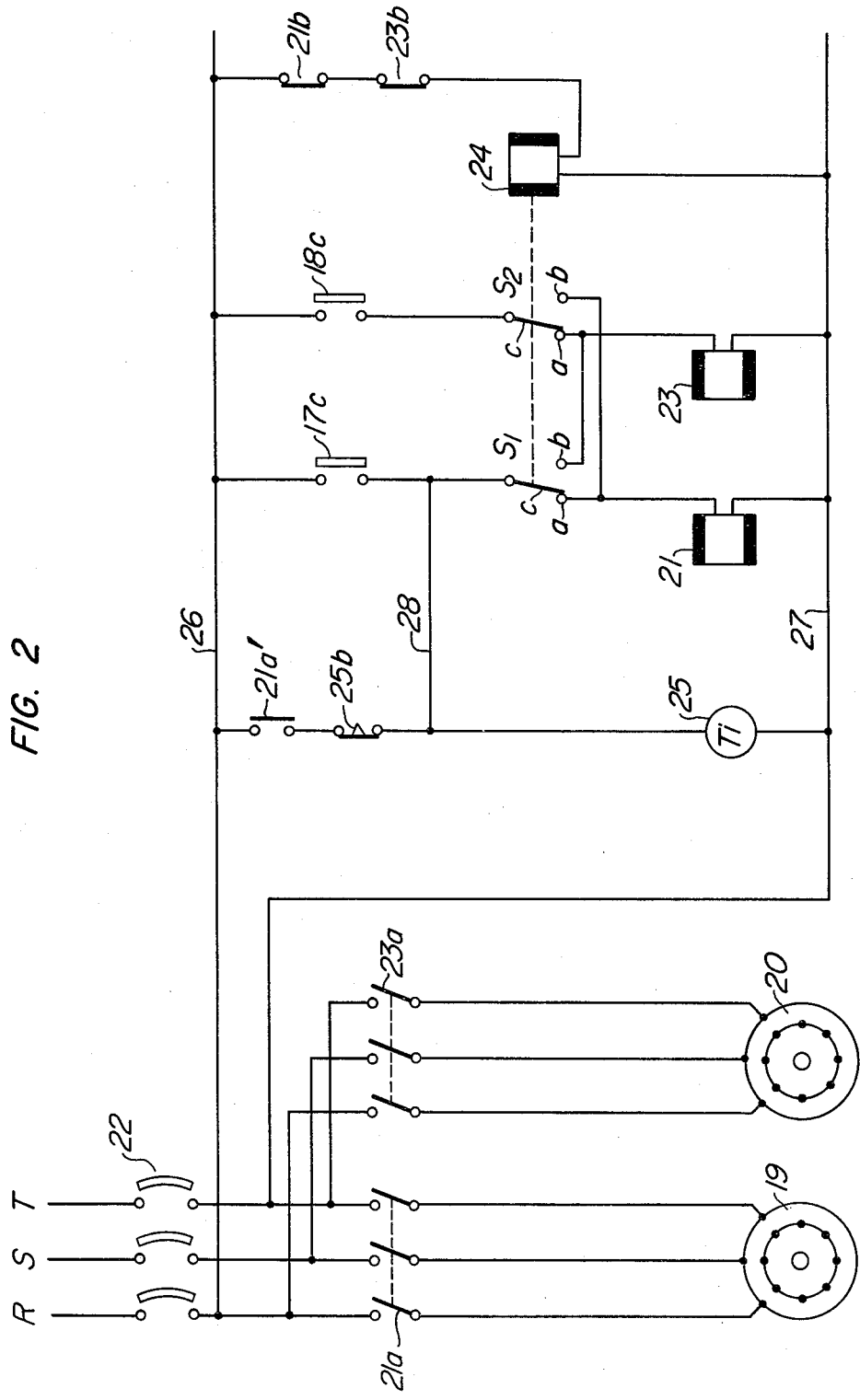
FIG. 2 is an electric circuit diagram for the apparatus.

The embodiment shown in FIGS. 1 and 2 depends upon the pressure switches 17, 18 that sense the pressure within the pressure tank 7 for the generation of signals for starting and stopping the pumps. However, because of a certain relationship between the pressure and the water level 16 in the pressure tank 7, the water level may be sensed in place of the pressure for the purpose of start-stop control of the pumps.

Figure 5:
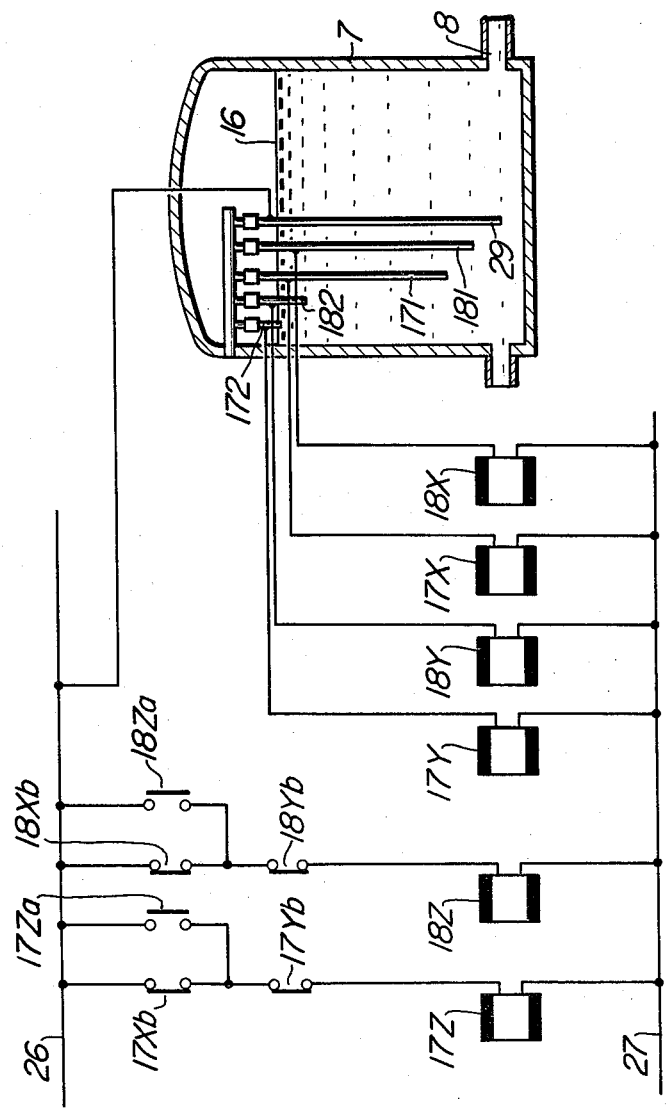
FIG. 5 is a circuit diagram showing part of the circuitry for another embodiment of the invention.

FIG. 5 illustrates another embodiment of the invention which uses water-level sensing electrodes as the first to fourth sensor means for the start-stop control of the pumps. Five electrodes 29, 171, 172, 181, 182, insulated from one another, are set within the pressure tank 7. The electrode 29 is for common use. The electrode 171 serves as the first sensor means which, when the water level in the tank has dropped below the lower end of the electrode, generates a signal indicating the necessity of starting the regular pump. The electrode 172 serves as the third sensor means which, when the water level in the tank has ascended above the lower end of the electrode, signals the recovery of water to the level high enough to stop the regular pump. The electrode 181 as the second sensor means signals the standby pump the necessity of starting, when the water level in the tank 7 has lowered below the lower end of the electrode. The electrode 182 as the fourth sensor means responds, when the water level in the tank has risen above the lower end of the electrode, to give a signal for stopping the standby pump. Thus, the common electrode 29 is directly connected to the control source line 26, and the electrodes 171, 172, 181, 182 are connected to the control source line 27 through relays 17X, 17Y, 18X, 18Y, respectively. Contacts 17Xb, 17Yb, which open when the relays 17X, 17Y are energized, and a relay 17Z are connected in series and connected together at both ends to the control source lines 26, 27. To the contacts 17Xb are connected, in parallel, contacts 17Za which close when the relay 17Z is energized. Contacts 18Xb, 18Yb, which close when the relays 18X, 18Y are energized are arranged in series with a relay 18Z and are connected at both ends to the lines 26, 27. Contacts 18Za which close when the relay 18Z is energized are connected in parallel with the contacts 18Xb.

The other details of the circuitry are the same as those in FIG. 2 except that the contacts 17c of FIG. 2 now serve as the contacts that close when the relay 17Z is energized and the contacts 18c serve as those that close when the relay 18Z is energized.

Since the circuit operation of the embodiment shown in FIG. 2 has already been explained, the description here is limited to that of the embodiment in FIG. 5. In this circuit arrangement, the relay 17Z is energized when the water level in the pressure tank 7 has descended below the lower end of the electrode 171, and it remains energized until the water level ascends to contact the electrode 172, when it will be deenergized. Similarly, the relay 18Z is energized when the water level in the pressure tank has gone down below the lower end of the electrode 181, remains energized until the water level comes up to contact the electrode 182, and then will be set free.

The circuit involved in the operation of the relay 17Z is of the same construction as that used for the operation of the relay 18Z, and therefore the former will be more fully described below while omitting further description of the latter. It is now assumed that the water level in the pressure tank 7 is above the lower end of the electrode 172 and the relays 17Y, 17X are both in energized state. Therefore, the contacts 17Xb, 17Yb are open and the relay 17Z is released. When the water level in the tank has fallen below the lower end of the electrode 172, the relay 17Y is deenergized. Then, the contacts 17Yb close but the relay 17Z remains deenergized, because the contacts 17Xb remain open as long as the water level is higher than the lower end of the electrode 171. When the water level has further declined below the lower end of the electrode 171, the lelay 17X is deenergized, too. Consequently, the contacts 17Xb, 17Yb both close and the relay 17Z is energized. Then, the contacts 17Za close and the relay 17Z sustains itself. When the water level in the pressure tank 7 has again risen to a level above the lower end of the electrode 171, the relay 17X is energized and the contacts 17Xb open, but, because the contacts 17Za, 17Yb both remain closed, the relay 17Z continues to be energized. Upon further ascent of the water level in the tank into contact with the lower end of the electrode 172, the relay 17Y is energized and the contacts 17Yb open. This deenergizes the relay 17Z and opens the contacts 17Za.

It will be appreciated from the foregoing description that the contacts 17c of the relay 17Z act to provide the outputs of the first and third sensor means and the contacts 18c of the relay 18Z act to provide the outputs of the second and fourth sensor means.

In the embodiment shown in FIG. 5, the lower end of the electrode 182 is below that of the electrode 171, and therefore, when the both pumps in operation are to be stopped, the standby pump always precedes the regular one in coming to a stop.

What is claimed is:

1. An apparatus for liquid supply comprising a plurality of pumps connected on the delivery sides to a main, a pressure tank provided on the delivery sides of said pumps, first sensor means for sensing the demand for the liquid and determining whether the preceding or regular one of said pumps should be started or not in response to a variation in the demand, second sensor means for sensing the demand for the liquid and determining whether the remaining or standby one of said pumps should be started or not in response to a variation in the demand, third sensor means for sensing the demand for the liquid and determining whether said regular pump may be stopped or not in response to a variation in the demand, fourth sensor means for sensing the demand for the liquid and determining whether said standby pump may be stopped or not in response to a variation in the demand, a timer which begins working upon receipt of the output from said first sensor means to generate a signal after the lapse of a predetermined period of time, standby-pump stop control means for stopping said standby pump immediately upon generation of a signal by said fourth sensor means, and regular-pump stop control means for keeping said regular pump running as long as said timer is in operation, regardless of the signal generation by said third sensor means, and for stopping said pump in response to a signal from said third sensor means after the operation of said timer.

2. An apparatus for liquid supply comprising a plurality of pumps connected on the delivery sides to a main, a pressure tank provided on the delivery sides of said pumps, first sensor means for sensing the demand for the liquid and determining whether the preceding or regular one of said pumps should be started or not in response to a variation in the demand, second sensor means for sensing the demand for the liquid and determining whether the remaining or standby one of said pumps should be started or not in response to a variation in the demand, third sensor means for sensing the demand for the liquid and determining whether said regular pump may be stopped or not in response to a variation in the demand, fourth sensor means for sensing the demand for the liquid and determining whether said standby pump may be stopped or not in response to a variation in the demand, a timer which begins working upon receipt of the output from said first sensor means to generate a signal after the lapse of a predetermind period of time, standby-pump stop control means for stopping said standby pump immediately upon generation of a signal by said fourth sensor means, regular-pump stop control means for keeping said regular pump running as long as said timer is in operation, regardless of the signal generation by said third sensor means, and for stopping said pump in response to a signal from said third sensor means after the operation of said timer, and switching means for changing over and reconnecting said regular and standby pumps that have stopped in succession, so that the pump that served as the regular one in the preceding run will be used as the standby pump in the next run for operation in response to the signals from said second and fourth sensor means and the pump that served as the standby pump will next time work as the regular one in response to the signals from said first and third sensor means.

3. An apparatus according to claim 2, in which said first sensor means is a pressure switch to be actuated at a first pressure in said pressure tank, said second sensor means is a pressure switch to be actuated at a second pressure lower than said first pressure in said tank, said third sensor means is a pressure switch to be actuated at a third pressure higher than said first pressure in said tank, and said fourth sensor means is a pressure switch to be actuated at a fourth pressure higher than said first pressure in said tank.

4. An apparatus according to claim 3, in which said first and third sensor means are combined in the form of a pressure switch to be set at said first pressure and reset at said third pressure, and said second and fourth sensor means are combined in the form of a pressure switch to be set at said second pressure and reset at said fourth pressure.

5. An apparatus according to claim 3, in which said third pressure is set to a value higher than said fourth pressure.

6. An apparatus according to claim 3, in which said third pressure is set to a value lower than said fourth pressure.

7. An apparatus according to claim 2, in which said first sensor means is a means to be actuated at a first liquid level in said pressure tank, said second sensor means is a means to be actuated at a second liquid level lower than said first level in said tank, said third sensor means is a means to be actuated at a third liquid level higher than said first level in said tank, and said fourth sensor means is a means to be actuated at a fourth liquid level higher than said first level.

8. An apparatus according to claim 2, in which said first sensor means is a pressure switch to be actuated at said first pressure in said pressure tank, said second sensor means is a flow-rate sensing means to generate a signal upon an increase in the rate of flow through said main above a predetermined value, said third sensor means is a pressure switch to be actuated at a pressure higher than said first pressure in said pressure tank, and said fourth sensor means is a flow-rate sensing means to generate a signal upon a decrease in the rate of flow through said main below a predetermined value.

9. A method for liquid supply through a system comprising a plurality of pumps connected on the delivery sides to a main, and a pressure tank provided on the delivery sides of said pumps, said pumps being divided into two groups by intended uses, i.e., for regular and standby uses, switchable to each other, the method comprising starting the regular pump first in response to a demand for the liquid, starting the standby pump, too, where more liquid is required than is delivered by said regular pump, and stopping said standby pump when the demand for the liquid has decreased to a level low enough for dispensing with said standby pump, while said regular pump is being operated for a predetermined period of time after the start, even when the demand has become low enough for stopping said regular pump.

* * * * *